US007441232B2

(12) United States Patent
Thompson et al.

(10) Patent No.: US 7,441,232 B2
(45) Date of Patent: *Oct. 21, 2008

(54) TASK MANAGEMENT

(75) Inventors: Simon G Thompson, Ipswich (GB); Brian R Odgers, Craigavon (GB)

(73) Assignee: British Telecommunications public limited company, London (GB)

( * ) Notice: Subject to any disclaimer, the term of this patent is extended or adjusted under 35 U.S.C. 154(b) by 1441 days.

This patent is subject to a terminal disclaimer.

(21) Appl. No.: 09/739,317

(22) Filed: Dec. 19, 2000

(65) Prior Publication Data

US 2001/0007976 A1    Jul. 12, 2001

Related U.S. Application Data

(63) Continuation-in-part of application No. 09/589,200, filed on Jun. 8, 2000.

(30) Foreign Application Priority Data

Nov. 8, 1999  (EP) .................................. 99308863

(51) Int. Cl.
*G06F 9/44* (2006.01)
*G06F 9/445* (2006.01)
(52) U.S. Cl. ........................ 717/116; 717/108; 717/174
(58) Field of Classification Search ................. 717/116, 717/108, 174; 707/206
See application file for complete search history.

(56) References Cited

U.S. PATENT DOCUMENTS

| 5,530,861 | A | * | 6/1996 | Diamant et al. ................. 705/8 |
| 5,608,894 | A | * | 3/1997 | Kawakami et al. .......... 717/162 |
| 5,699,310 | A | * | 12/1997 | Garloff et al. ................ 717/108 |
| 5,734,837 | A | * | 3/1998 | Flores et al. .................... 705/7 |
| 5,768,506 | A | * | 6/1998 | Randell ....................... 709/202 |
| 5,802,527 | A | * | 9/1998 | Brechtel et al. ............. 707/200 |
| 5,838,595 | A | * | 11/1998 | Sullivan et al. ................. 703/2 |
| 5,890,133 | A | * | 3/1999 | Ernst .............................. 705/7 |
| 5,898,870 | A | * | 4/1999 | Okuda et al. ................. 718/104 |
| 5,950,186 | A |  | 9/1999 | Chaudhuri et al. |
| 5,978,933 | A | * | 11/1999 | Wyld et al. ..................... 714/13 |
| 6,011,917 | A | * | 1/2000 | Leymann et al. ............ 717/108 |
| 6,044,354 | A | * | 3/2000 | Asplen, Jr. ...................... 705/7 |
| 6,088,779 | A | * | 7/2000 | Bharadhwaj ................. 711/206 |
| 6,115,039 | A | * | 9/2000 | Karren et al. ................ 345/746 |
| 6,119,173 | A | * | 9/2000 | Pullen et al. ................. 719/328 |
| 6,157,948 | A | * | 12/2000 | Inoue et al. .................. 709/219 |

(Continued)

OTHER PUBLICATIONS

S. Jablonski, "On the Complementarity of Workflow Management and Business Process Modeling", 1995, SIGOIS Bulletin, p. 33-38.*

(Continued)

*Primary Examiner*—Wei Hien
*Assistant Examiner*—Qamrun Nahar
(74) *Attorney, Agent, or Firm*—Nixon & Vanderhye PC

(57) ABSTRACT

Customised process plans are generated by weaving customising process aspects into generic process plans. The aspects as stored contain markers and the system selects a generic process plan and searches it for the marker(s). If the marker is located, content from the relevant aspect is woven into the generic process plan at that point. Customised process plans can be produced for instance for particular customer types or service types and local resource availability can be taken into account.

17 Claims, 11 Drawing Sheets

U.S. PATENT DOCUMENTS 6,233,537 B1 * 5/2001 Gryphon et al. ................ 705/7
6,467,086 B1 * 10/2002 Kiczales et al. ............. 717/165
6,473,895 B1 * 10/2002 Lopes et al. ................ 717/128
6,539,390 B1 * 3/2003 Kiczales et al. ............. 707/101

OTHER PUBLICATIONS

Schmidt, et al. "Extending Aspect-Oriented Programming in order to Flexibly Support Workflows", 1998, ICSE98 AOP WS, p. 1-13.*

Heinl, et al. "A Comprehensive Approach to Flexibility in Workflow Management Systems", 1999, ACM, p. 79-88.*

Ochuodho, et al. "A Process-Oriented Version and Configuration Management Model for Communications Software", 1991, ACM, p. 109-120.*

Schmidt, et al. "The Interrelatedness of Component-oriented Systems And Workflow-Management", 1999, p. 1-4.*

Kiczales, et al. "Aspect-Oriented Programming", 1997, ECOOP, p. 1-25.*

Walker, et al. "An Initial Assessment of Aspect-oriented Programming", 1999, ACM, p. 120-130.*

Constantinides, et al. "Designing an Aspect-Oriented Framework in an Object-Oriented Environment", 2000, ACM, p. 1-12.*

E. A. Kendall, "Role Model Designs and Implementations with Aspect-oriented Programming", 1999, ACM, p. 353-369.*

Kersten, et al. "Atlas: A Case Study in Building a Web-Based Learning Environment using Aspect-oriented Programming", 1999, ACM, p. 340-352.*

Schmidt, et al. "CompFlow: A Component-based and Aspect-separated Architecture for Workflow Support", 1998, EDBT Workshop on Workflow Management systems, p. 39-44.*

Odgers et al. Aspect Oreinted Process Engineering (ASOPE). ECOOP. Jun. 14, 1999.*

Odgers, B., Thompson, S., "Aspect-Oriented Process Engineering (ASOPE)", 1999, p. 1-4, http://trese.cs.utwente.nl/aopecoop99/papers/thompson.pdf.

Brain Odger, Simon Thompson: "Aspect-Oriented Process Engineering (ASOPE)" Internet Document: European Conference on Object Oriented Programming 1999, Proceedings of the Aspect Oriented Programmation Workshop, 'Online! Jun. 14-18, 1999; Lisbon, Portugal.

Willem Jonker, "Workflow Management Systems and Cross-Organisational Logistics", Internet Document: Proceedings of the Workshop on Cross-Organisational Workflow Management and Coordination, 'Online!, Feb. 22, 1999, San-Francisco, USA.

Gamma E. Helm, R. Johnson, R. & Vlissides, J. "Design Patterns: Elements of Reusable Object-Oriented Software", Addison-Wesley Professional Computing Series, Addison Wesley 1995.

Harker PT, Ungar L.H., "A Market-based approach to workflow automation", Proceedings of NSF. Workshop on Workflows and Process Automation in Information Systems: State of the Art and Future Directions, May 8-10, 1996.

Jennings NR, Faratin P. Johnson MJ. O'Brien P. and Wiegand ME, "Using Intelligent Agents to Manage Business Processes". In: Proceedings of the First International Conference on the Practical Application of Intelligent Agents and Multi-Agent Technology (PAAM96). London, UK, 1996. The Practical Application Company Ltd., pp. 345-360.

Shepherdson J.W., Thompson S.G. Odgers, B.R. "Cross Organisational Workflow Coordinated by Software Agents", In: CEUR Workshop Proceedings No. 17 *Cross-Organisational Workflow Management and Co-ordination*, 1999.

Schmidt, R. & Assmann, U. "Extending Aspect-Oriented Programming In Order To Flexibly Support Workflows" In: Proceedings of the Aspect-Oriented Programming Workshop At ICSE '98 (Cristina Lopes et al—organizers); pp. 1-6 (pp. 42-47 of Proceedings); 1998; (http://www2.parc.com/csl/projects/aop/workshops/icse98/aop-icse98-proceedings.pdf).

"*The Integrated Supply Chain Management Project*", Enterprise Integration Laboratory Department of Industrial Engineering, University of Toronto; Nov. 8, 2000.

European Search Report for EP Appln. No. 00 30 9922, Jan. 2001.

* cited by examiner

Fig.3.

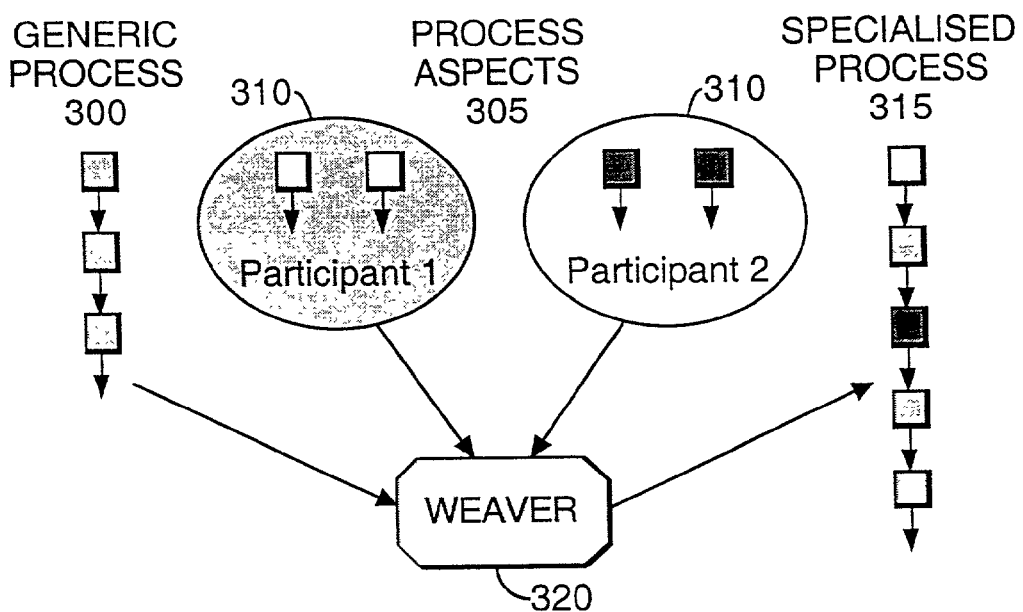

GENERIC PROCESS 300  
PROCESS ASPECTS 305  
SPECIALISED PROCESS 315

Fig.4.

Process for Customer Type 1 is:

\*\*\*\*\*\*\*\*\*\*\*\*\*\*\*\*\*\*\*\*\*\*\*\*\*\*\*\*

Acquire appropriate job information

Book visit time and address, allocate engineer

Acquire customers mobile contact number

Wait for visit time

Verify appointment with customer Phone number=12345678

Process for Customer Type 2 is:

\*\*\*\*\*\*\*\*\*\*\*\*\*\*\*\*\*\*\*\*\*\*\*\*\*\*\*\*

Acquire appropriate job information

Book visit time and address, allocate engineer

Supply code word to customer

Wait for visit time

Verify code word with customer

Fig.5.

| 505 | | Corporate | SME | Individual |
|---|---|---|---|---|
| niche | dispose | Servicing | Replace | C enabled |
| niche | value | C enabled | Open Testing | |
| mass | dispose | 3rd Party | Replace | C enabled |
| mass | value | Servicing | | |

Fig.7.

| 505 | | Corporate | SME | Individual |
|---|---|---|---|---|
| niche | dispose | Servicing | Replace | C enabled |
| niche | value | | | |
| mass | dispose | | | |
| mass | value | | | |

Fig.8.

| 505 | | Corporate | SME | Individual |
|---|---|---|---|---|
| niche | dispose | Replace | | |
| niche | value | Open Testing | | |
| mass | dispose | Replace | | |
| mass | value | Servicing | | |

Fig.9.

| 505 | | Corporate | SME | Individual |
|---|---|---|---|---|
| niche | dispose | Servicing | Replace | C enabled |
| niche | value | C enabled | Open Testing | |
| mass | dispose | Servicing | Replace | C enabled |
| mass | value | Servicing | | |

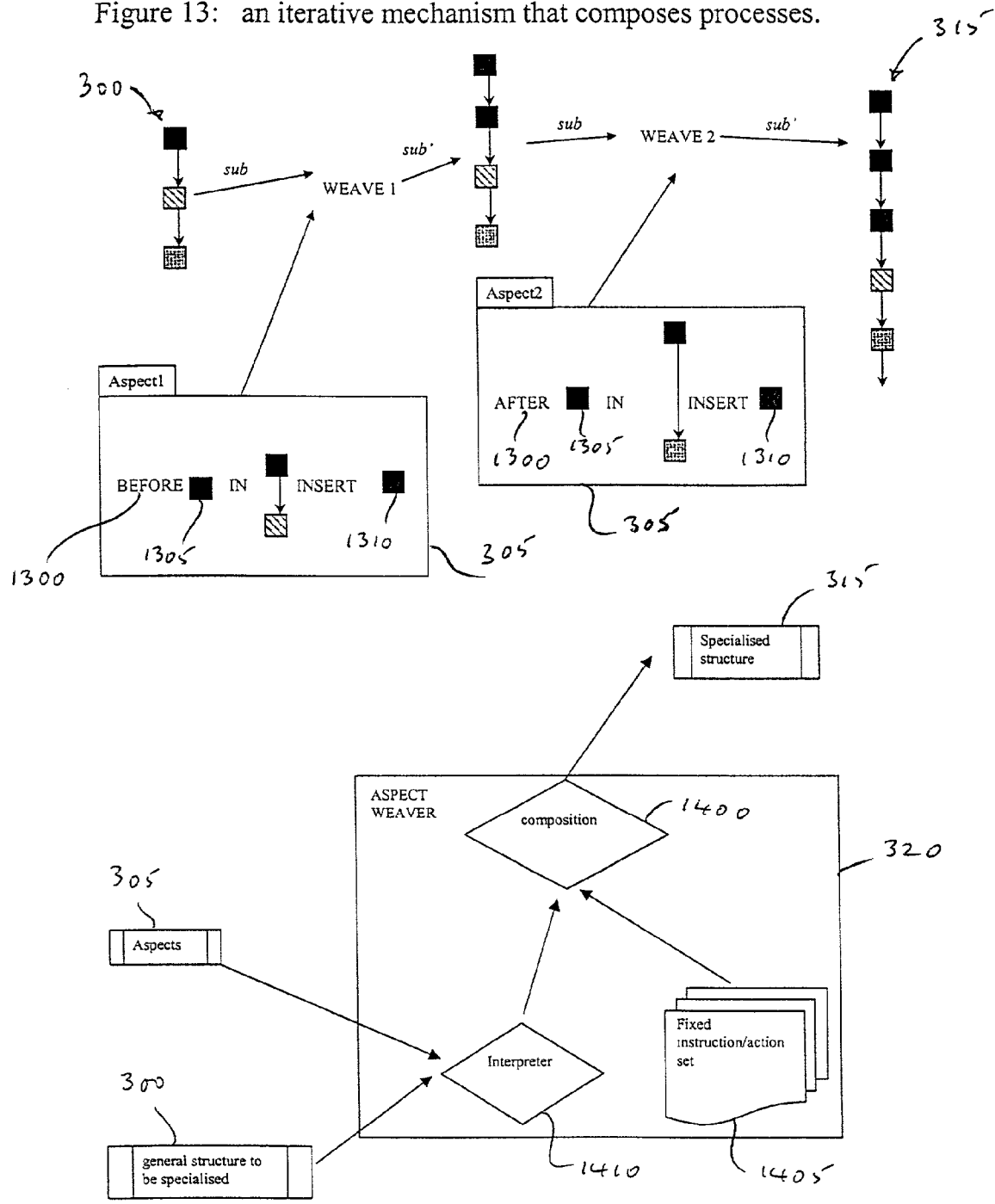
Figure 13: an iterative mechanism that composes processes.
Figure 14: composition of aspects and user defined structures

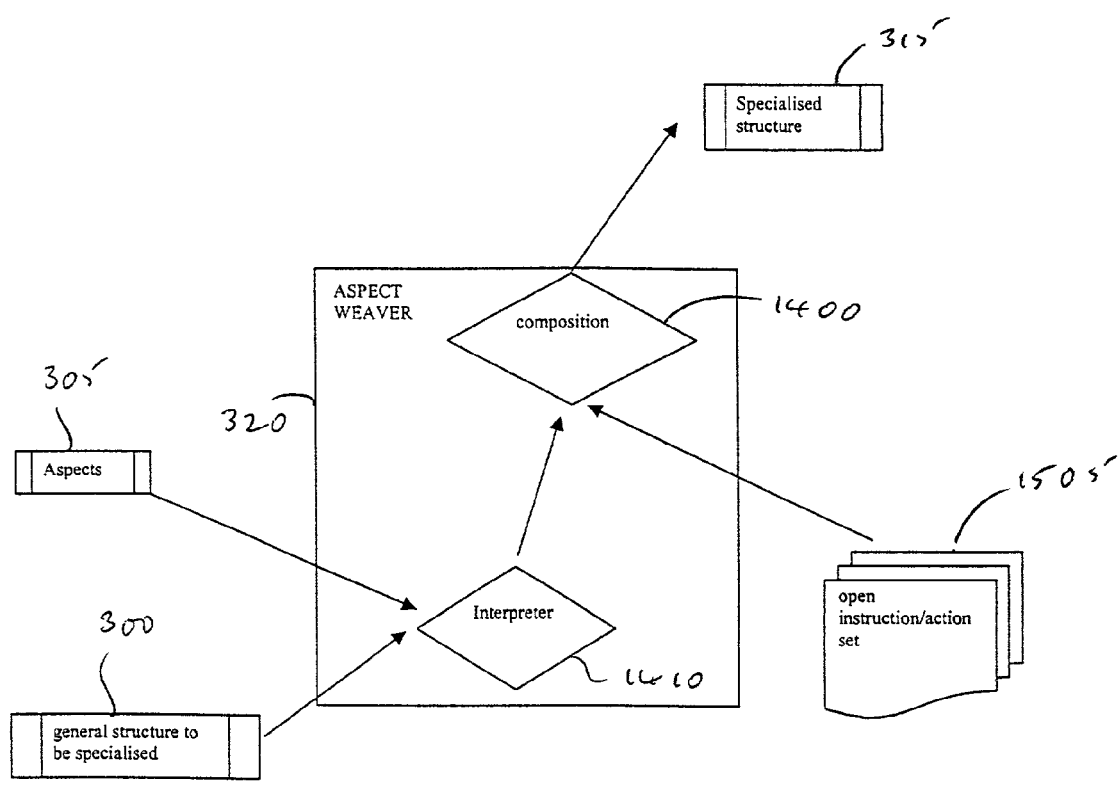
Figure 15: An aspect weaver with an open instruction/action set.

TASK MANAGEMENT

CROSS REFERENCE TO RELATED APPLICATION

This application is a continuation-in-part of application Ser. No. 09/589,200, filed Jun. 8, 2000, the entire content of which is hereby incorporated by reference in this application.

BACKGROUND

1. Technical Field

The present invention relates to task management and particularly to the ordering and customisation thereof.

2. Description of Related Art

Task management is often at least partially automated these days, particularly scheduling and resource allocation. However, the generation of appropriate task sequences, prior to scheduling and resource allocation, in the light of actual constraints and circumstances, remains a challenge.

It is known to apply automation to processes. For instance, the Enterprise Integration Laboratory of the University of Toronto has published material such as the report "Integrated Supply Chain Mangement Project" by Mark S Fox, Mihai Barbuceanu, Mahamud Gani and Chris Beck which can be seen at the world wide web Website.eil.utoronto.ca/iscm-descr.html. This focuses on the management of business processes as they are executed.

BRIEF SUMMARY OF EXEMPLARY EMBODIMENTS

Embodiments of the present invention deal with generation and modification of task sequences and content, for potential use with resource management systems.

References below to "ASOPE" are references to embodiments of the present invention. "ASOPE" is an acronym for "Aspect Oriented Process Engineering" and is the name used for the principle underlying embodiments of the present invention.

Inventive aspects of embodiments of the present invention may be identified from the description and include the subject matter set out in the claims.

DESCRIPTION OF THE DRAWINGS

A process generation system according to an embodiment of the present invention will now be described, by way of example only, with reference to the accompanying drawings in which:

FIG. 3 shows schematically the process generation system drawing on aspect repositories allocated to two interested parties in generating a program;

FIG. 4 shows listings for two programs generated by the process generation system, each appropriate to a different respective interested party;

FIG. 5 shows a target service problem management matrix mapped against customer types and service types;

FIGS. 7 and 8 show intermediate matrices in generating a service problem management matrix designed to implement the target matrix of FIG. 5;

FIG. 9 shows a generated service problem management matrix using the system;

FIGS. 13 to 15 show an alternative embodiment of the invention.

DETAILED DESCRIPTION OF EXEMPLARY EMBODIMENTS

Figure 1:
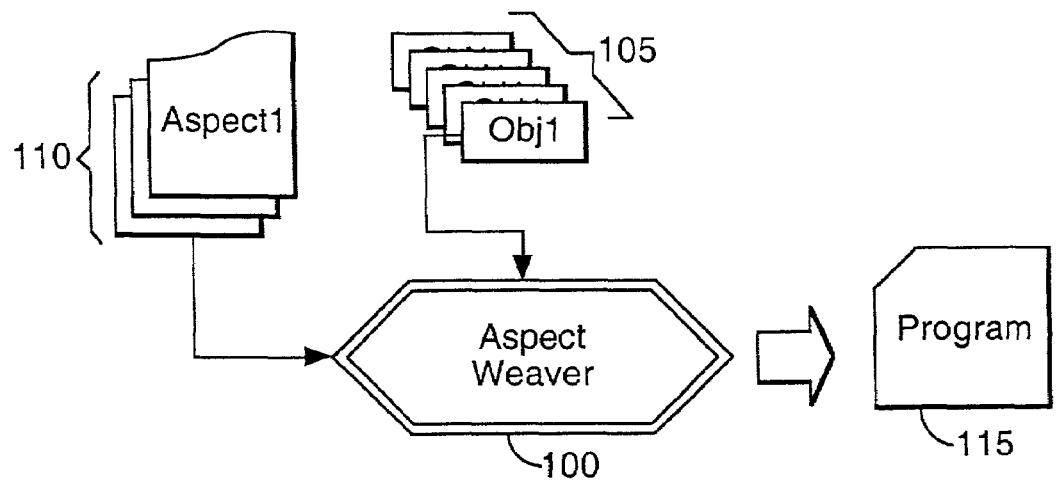
FIG. 1 shows schematically the process generation system drawing on two repositories and a set of rules in generating a program.

Processes can be of different types. A computer process, in particular a computer program, is compiled and run as logical instructions to be translated and acted on by a machine. Other processes are instantiated as physical systems involving people. In particular, there are inputs and outputs to allow decision making, optimisation and customisation by users which will affect the process as performed to produce for instance local, individual and/or time based variations. It is these other processes which ASOPE is particularly adapted to generate and support.

ASOPE decomposes processes into two elements, Generic Process Patterns (GPPs) which are the fundamental sequences of steps which are used to achieve a goal, and Process Aspects which contain context specific process steps together with instructions for their composition with a particular GPP. In this way it is possible to use ASOPE to synthesise wholly new processes that achieve a goal but, with respect to one another, utilise extra or alternative process steps for example to achieve unrelated sub-goals or prevent the system from reaching a particular state. An example of a GPP would be a plan to install customer premises equipment. Process Aspect examples would be access checks for premises related to an individual, or checking that the site could support physical diversity for a corporate working in the finance industry. GPPs are decontextualised, generalised plans and Process Aspects provide context, resource and participant dependent exceptions and extensions.

A primary objective of decomposing processes in this way is to construct a generative representation that facilitates the reuse of process elements developed in the past, and "must do" elements derived from local working practice or policy decisions. A secondary objective is to develop a representation that is capable of being structured in a way that reflects the real structure of the organisation which generates and maintains the knowledge.

The use of process aspects which are first class objects within ASOPE enables the development of a process design meta-process that allows information on the current context of the business process, that will affect its structure, to be woven into it at runtime. Also use of a cross cutting abstraction like aspect-orientation has an impact on the taxonomy of process objects that an ASOPE style system would implement.

Object orientation, as used in ASOPE, is the idea that modules in programs should contain instructions and data definitions that relate to one logical abstraction in the domain of the program. Each module should represent the data and operations that concern just one thing or conceptual entity that the programmer, designer or analyst has described. Object orientated modules are called classes, because they define a class of objects.

For example if one were building a program that ran a company payroll using object orientated techniques you would write a class for the company's employees, a class for tax information and some business logic classes representing the way that the system is to make payments. Each employee would be represented within the system by an object instance which would be a realisation of the appropriate class, so the tax office would be represented by just one instance of the tax class.

The power of the object orientated abstraction as far as programming is concerned is the hierarchical typing of the classes which enables the programmer to generalise about types of objects in the system. For example if the company wishes to employ a student trainee who is exempt from taxation it would be possible to write a class defining non-taxable-employees which would inherit all the properties of a normal employee. However, this class would include different code to be used to calculate the final net pay of the employee, this time without tax. The advantage of this is that if the normal employee class is changed in other ways, improving holiday allowances for example, then the inheritance relationship between the normal employee class and the non-taxable-employee class will ensure that the changes will be propagated to it as well. These inheritance relationships can be used to greatly simplify the conceptual structures of the programs thus making them easier to develop, and sometimes easier to maintain.

Although object orientated abstractions have been extremely successful in reducing the whole life cost of software systems, when a larger more complex implementation has been attempted drawbacks with the object orientated abstraction have become apparent. Problems include:

Object schizophrenia. In order to handle the complex behavior of a particular logical entity in a system it is often necessary to decompose the entity into many smaller more easily written classes. The entity is intended to be one class; but, instead, it is comprised of multiple classes, each with its own identity once instantiated into an object. While this tactic allows the designer or programmer to conceptualize the implementation clearly as they construct it, and helps them to manage the detail of the implementation, it makes the task of an outsider attempting to comprehend the system and the function of its parts far harder. This can lead to many symptoms of a bad program, including broken delegation and broken assumptions.

Composition and interactions constraints (and inconsistencies). Object orientated systems impose a number of constraints on the way that objects can be composed and can interact. These constraints are largely arbitrary and are not standard across all object orientated languages and implementations. For example in C++ the concept of a friend function allows a more sophisticated model of interaction between objects to be defined than is possible in Java. Inconsistencies arise because conflicts can arise from different design principles which one wishes to use to construct a program. Videira Lopez (1997) points out in "D: A Language Framework for Distributed Programming", a PhD thesis for the College of Computer Science, Northeastern University, that if one were to make variables of a base class available to a sub-class then the sub-classes can make policy decisions based on the object state; but this violates the referential integrity of the base class and is discouraged in frequently cited design guidelines.

Interface bloat or, alternatively, downcasting. In order to maintain the object orientated abstraction it is often necessary to implement classes that have several different roles for different elements of the system. In the payroll system discussed so far employees would have one relationship to an object with responsibility for calculating a pay bill, and another relationship to an object with responsibility for calculating pension contributions (they might implement a pensioner interface for example). These multiple relationships and roles force the programmer to implement several interfaces, or sets of function calls in significant objects of the system which increases their size, and muddies their function. Downcasting is an alternative strategy which enables a programmer to handle this kind of problem by instructing the program compiler to regard an object as being of different types at different points in the programs thread of control. However downcasting is a dangerous practice for two reasons. Firstly the semantics of a down cast are different between various object orientated languages (for example in C++ a downcast leads the compiler to execute the method of the class that the object has been downcast to, but in Java the method will be the actual method implemented for the objects "real" class). Secondly, downcasts violate the type checking support that is one of the major benefits of object orientated technology.

Cross Cutting. Behaviours that are required throughout an entire system, such as particular safety protocols or quality of service assurance procedures, often need to be re-implemented in multiple places if they are to be integrated with a object orientated program. This kind of required behavior is said to cross cut the objects. Cross cutting leads to tangling (Kiczals et al June 1997, in "Aspect-Oriented Programming", proceedings of the European Conference on Object-Oriented Programming published by Springer-Verlag). A tangled program is one in which concerns that should be encapsulated together are scattered across a number of modules. Tangled code is difficult to locate and change during maintenance.

These problems have encouraged software engineers to develop other abstractions that are better fitted to the kind of encapsulations that are required for the development and maintenance of large and complicated computer systems in environments where resource constraints and time to market pressures are paramount.

Subject orientated programming" (by Osher & Harrison 1992, published in "Combination of Inheritance Hierarchies", Proceedings of 1992 Conference on Object-Orientated Programming Systems, Languages, and Applications) addresses the fact that different entities view the same object from different perspectives. These perspectives are not filtered views; some properties and behavior only exist because of the perspective. Subject oriented programming (SOP) provides extra language features above and beyond object oriented programming to support subject decomposition, implementation, and re-composition. In SOP, a subject is defined as a collection of classes or class fragments that models its domain or area in its own, subjective way.

Although subject oriented programming appears to be a considerable advance on object orientated programming, there is another approach, aspect oriented programming, that provides a more generic method of integrating cross cutting behavior than SOP.

Aspect oriented programming also adds extra language features to object oriented programming. Aspects cut across or cross cut the units of a system's functional decomposition (objects). Examples provided in the literature are synchronization, exception handling, monitoring and auditing, quality of service, and many others.

Referring to FIG. 1, research has produced language constructs and compilers (called Aspect Weavers 100) that can interleave or weave component definitions 105 (objects) and aspect definitions 110 (programs) appropriately to formulate a unified and executable program 115.

To implement the embodiment of the present invention described below, the Java based AOP environment (AspectJ™) from Xerox PARC and a known AOP language are used. Information on these is available for instance published by Videira Lopes, C. & Kiczales, G in "Recent Developments in AspectJ™", in ECObject OrientatedP'98 Workshop Reader, Springer-Verlag LNCS 1543.

Figure 2:
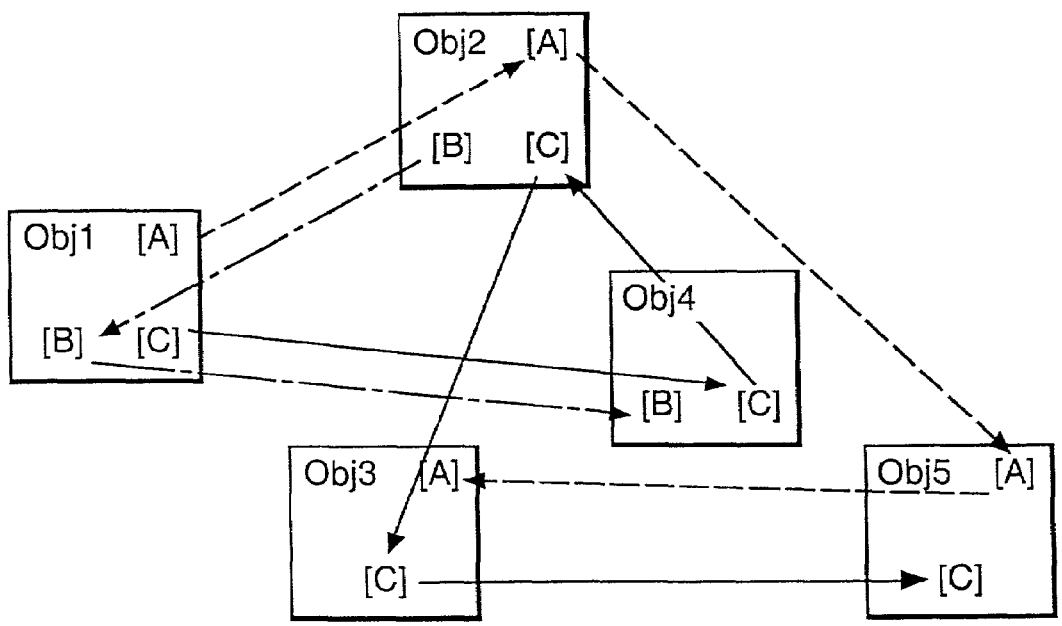
FIG. 2 shows a set of objects, some of which share functionality.

Referring to FIG. 2, the genesis of aspects may be more clearly understood if one considers five objects, Obj1-Obj5, involved in three activities, [A],[B], and [C]. If the objects are instances of five different classes, the functionality required to carry out the activities cross cuts method definitions (potentially many) in five separate classes.

Aspects are first class objects, which are woven into a program at compile time, but with their own independent state. As is implied by their status as first class objects, an aspect can be woven with several different objects within a program and the state of the aspect is shared and updated by all of those objects that are woven with it.

Processes are sometimes required to be flexible and dynamic. However some processes remain cumbersome and difficult both to construct and comprehend. This is because of the numerous "special cases", exceptions and decision points that must be included in a realistic process implemented by a large organisation that sets the needs of its customers as a priority. For example a process developed to provide International Private Circuits for customers of BT (the applicant) contains sixteen decision points on the top level process; sixteen top level process tasks and each of the top level processes contain numerous decision points and exceptions themselves. Research techniques, such as agents in business processes, solve numerous problems in the provisioning and enactment stages of processes but the flexible creation of processes, given the needs of the participants (consumer, employee, regulator, etc), has not been developed in the same way.

ASOPE considers the construction of specialised processes from generic cores and context dependent elements. New process steps or different process sequences can be implemented as new policies and instructions are disseminated across a domain. The essence of the process is abstracted from the detail of customer preferences, local working agreements and management instructions and then reused for different customers, workplaces and management domains.

Referring to FIG. 3, in order to abstract the core of the process from the context or customer dependent elements that must be considered, the process is defined in terms of two sets of components:

Generic Process Patterns 300: partially ordered processes, which consist of process steps, which are obligatory for a particular goal to be achieved. These are an ordered list of the conditions that must be satisfied for the goal to be successful; and Process Aspects 305: process steps that can be included in a business process in order to customise it for execution by a particular resource.

A generic process pattern 300, a core process that must be executed in order to achieve a type of goal, comprises a set of processes that has been loaded to the system for instance because they are publicly advocated for use by management and subscribed to by operational units.

The process aspects 305 are then context dependent process steps that should be carried out in order to achieve a particular goal for instance allocated to a particular team, in a particular place for a particular customer. Process participants are provided with interfaces 310 in order that they can load their particular process aspects 305 to be woven by the aspect weaver 320 into the generic process 300 to create a specialised ordered process 315 for execution.

The process aspects 305 used are a subset of an overall available set of aspects and the process context determines their use. The aspect weaver 320 does not just append process steps onto another process. It merges aspects 305 with the GPP 300 according to weaving rules instantiated by the aspect weaver 320 and weave instructions that are coded into the aspects 305 themselves.

Aspects 305 can introduce new process steps, and they can advise existing process steps. An advise weave appends new process instructions into a particular place in the process. The process position that an aspect's advise weave is to be woven at is determined by the weaver 320 matching patterns defined in the aspect 305 to a process step name in the GPP 300 with wild cards matching to the preconditions and post conditions of the process step.

The processes are arranged hierarchically using a frame based object orientated organisation, allowing this kind of match and weave process to be used to merge process sequences together.

In the following are described two examples of how this can be applied to process activities.

EXAMPLE 1

Customised Processes for Telephone Installation

Many commercial organisations have a core activity that concerns the installation or servicing of equipment at a customer's site or domicile. For example: gas, water and electricity utilities must install, service and read meters in order to bill their customers.

Consider the example of installing a phone, a business process that has some significance for BT. A simple set of core generic process steps are required for all customers, no matter where they are in the country, or which engineer does the installation. However, some steps will be different from customer to customer. A corporate customer may require adherence to a previously agreed contract, breach of which may be unacceptable. Providing a service in a rural area may involve more travel time, but it will be unnecessary to book a parking bay for the engineer's van, however in the City of London parking space may need to be pre-arranged.

In order to apply ASOPE to the process of installing a telephone it is necessary to define the participants and the generic process of installation (the GPP 300) to be used. For the purposes of this example two different (simplified) customer types are considered.

Customer type 1: Customer's time is paramount.
Customer type 2: Customer's security is paramount.

While the goal of installing a telephone is identical for both of these customer types, they are qualitatively very different. Customer type 1 will place a premium on appointments being kept and probably can supply a mobile phone number that allows them to be contacted a short time before the technician arrives to carry out the work. Customer type 2 will be available for the visit of the technician and will require a special identification procedure to reassure them that the technician is genuine.

A single process can be used to achieve the goal of installation for both groups of customer. However, by localising knowledge of extra process steps each customer requires in a process aspect 305, the process can be untangled to provide a customised process for each of the customer types.

An aspect 305 for each customer type to be considered is defined. An aspect hierarchy could be created that can be used to inherit behaviour, but for this example the two customer aspects are considered in isolation.

```
aspect CustomerType1 extends Customer{          public void acquireJobDetails( ) {
int customerPhoneNumber = 0 ;                      System.out.println("Acquire
    advise                                         appropriate job information") ; }
       *installPhone.bookVisit(*) {             public void bookVisit( ) {
         after {                                   System.out.println("Book visit time
         System.out.println("Acquire customers     and address, allocate engineer") ; ; }
         mobile contact number") ;             public void waitUntilVisit( ) {
         customerPhoneNumber = 12345678 ;          System.out.println("Wait for visit
              }}                                   time") ; }
    advise                                      public void installEquipment( ) {
       *installPhone.installEquipment(*) {         System.out.println("Carry out
before {    System.out.println("Verify            appropriate installation work") ;}
appointment with customer number = " +         public void billCustomer( ) {
String.valueOf                                    System.out.println("Send bill to
(thisAspect.customerPhoneNumber)) ; }}}           customer") ; }
aspect CustomerType2 extends Customer{          public void planPattern ( ) {
    advise *installPhone.installEquipment            acquireJobDetails ( ) ;
    (*) {                                            bookVisit( ) ;
       before {System.out.println("Verify           waitUntilVisit( ) ;
         ode word with customer") ; }}              installEquipment ( ) ;
    advise * installPhone.bookVisit(*) {            billCustomer( ) ; }
       after {System.out.println("Supply
         code word to customer") ; }}
```

In the above, the left hand side shows instantiated aspects in relation to CustomerType1 and CustomerType2 and the right hand side shows a generic process pattern for phone installation to be used as the basis for the process. The aspects are instantiated, as is the process pattern, in an Aspect-J™ module. Each customer's process aspect is then added to the process pattern in turn to produce two customised processes, shown in FIG. 4.

It can be seen that the aspect in relation to CustomerType1 contains sufficient information for the aspect weaver 320 to locate where and how to modify the GPP 300 for phone installation shown on the right hand side. In particular, it tells the aspect weaver 320 to extend the GPP 300 by adding a print line "Acquire customers mobile contact number" at the end of "bookVisit", to add the print line "Verify appointment with customer number . . . " before "installEquipment", and it instantiates the customer's fixed network telephone number 12345678.

With respect to the aspect in relation to CustomerType2, this one tells the aspect weaver 320 to extend the GPP 300 by adding the print line "Verify code word with customer" before "installEquipment".

Even the simple examples given above show the need for aspect instances. Customer Type 2 requires that a code word is set for each appointment. It is appropriate to associate this information with the customer, and an aspect instance is an appropriate way of handling this.

The following section describes another example of how a process can be decomposed into generic process plans and process aspects. This example describes the problem of structuring a service provision process that is dependent on both the type of customer buying the service and the type of service being sold.

Providing and managing communications services is a key activity for communications providers such as the applicant. A large portfolio of services of various types can exist, with each customer requiring a different subset of provision in order to conduct their business. In order to provide a service it is necessary to provide methods that are appropriate for its management and maintenance at a level acceptable to the customer. Unfortunately customer requirements and resources vary considerably. For instance, it is inappropriate to provide a "five nines" (99.999%) availability of a service at the cost of thousands of pounds each year for an individual. The individual can accept a much higher level of unavailability and cannot afford the charge for the service with this level of maintenance. On the other hand, a corporate customer may view thousands of pounds a year as a small price to pay for high availability of a business critical service such as voice mail. Also, it may be against the service provider's interest to provide a lower level of availability for a business critical service because of the impression of unreliability that it would create with a valuable corporate customer.

FIG. 5 shows a matrix of various problem management strategies that might need to be applied to service types for differing customers. The matrix contains twelve elements representing the requirements for problem management given a particular type of service for a particular customer. Each of the entries in the matrix indicates a type of problem management that is applicable to the context mapped by the service type and the customer type. There are six different problem management strategies that might be adopted.

Replace indicates that a service provider, acting as a broker between the network company providing the network infrastructure for the service and the customer, will replace the service rather than attempt to discover the problem and fix it.

C-Enabled is a customer enabled problem management strategy, where the customer is provided with a suite of diagnostic and trouble shooting tools which enable them to manage problems as they arise in the service.

Servicing is for the service provider to attempt to avoid faults in the service to prevent its failure, in much the same way that a car would be serviced to prevent a breakdown.

PM-enabled (not shown) posits the existence of self diagnostic abilities for the service that will allow it to predict and report impending failures that will allow preventative action to be taken (the PM in the name is taken from Photocopier Model, a reference to the ability of modern office automation systems to phone faults through to their suppliers).

Open Testing provides the customer with the ability to test for faults on the service, but requires that the network connector provides the problem solving activity.

3rd party relies on the existence of a specialised 3rd party rescue service, similar to breakdown and recovery organisations that motorists join and use if their cars fail.

Figure 6:
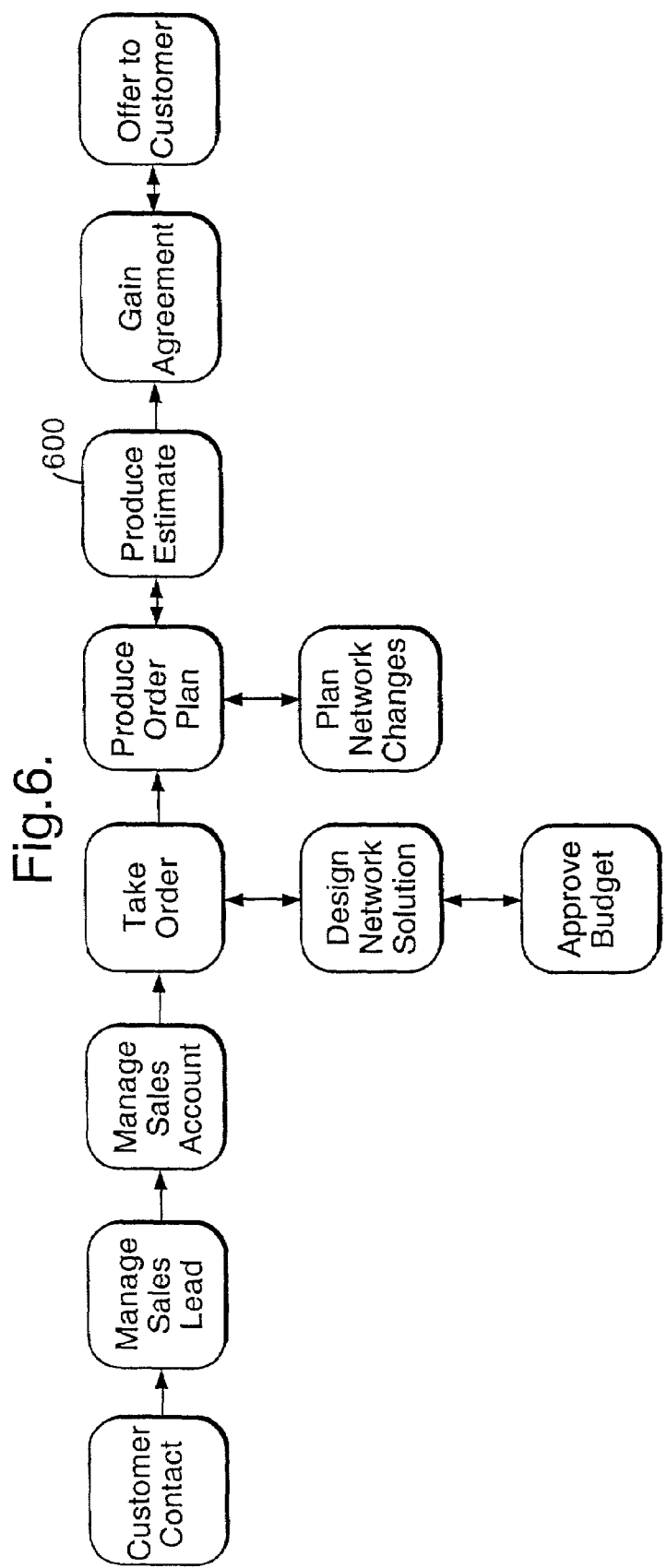
FIG. 6 shows a generic process plan relevant to the target matrix of FIG. 5.

The goal of the GPP here is to be able to prepare a quote for providing a particular type of service to a particular type of customer taking into account the amount of problem management that it is appropriate for the customer to do themselves. It is possible to achieve the goal by using an aspect orientated representation to fold the matrix into its axis and represent the problem management strategies as process aspects representing the type of service type and the type of customer for that service. These can then be woven together, with a generic process pattern representing the process (shown diagrammatically in FIG. 6) to generate service provision processes tailored to the customer, and to the service that is to be provided.

In order to be able to do this, the elements need to be defined that will be used as knowledge stores. Referring to FIG. 5, the aspects can be identified that will be required to store the knowledge to customise the business process. There are three types of customer 500 (Corporate, SME and Individual) and four types of service 505 (niche-dispose, niche-value, mass-dispose, mass-value). All of the process aspects 500,505 (the service types and the customer types) contain advise weaves (equivalent to that shown above for the telephone installation example) which introduce extra process information to the generic process plan of FIG. 6 at the "produce estimate" step 600.

Referring to FIG. 7, by using just the customer type aspects 500 to contextualize the process, a matrix is produced (selecting the most repeated matrix elements for each of the columns).

Alternatively, referring to FIG. 8, by using just the service type aspects 505, a different matrix can be produced. The aspect information here was generated by selecting the most commonly shown strategies for problem management in the matrix co-ordinates as shown in FIG. 5, selected in order to generate a best fit to the original matrix. However, the niche-value and mass dispose categories both contained a different strategy for each customer type. This forced an arbitrary choice for one of the strategies. It is preferable to use domain knowledge to determine which strategy would be best if applied for all customers.

Both FIGS. 7 and 8 show that weaving across one axis of the problem management matrix can be used to specialise a generic process to some degree. However, in order to regenerate the original matrix shown in FIG. 5 both sets of aspects need to be woven into the plan. In order to do this, a set of precedence relationships is needed which can be defined against the aspects, which will force the weaver to make the correct decision as to which strategy to choose. Alternatively if the aspect weaver operated according to some known weave ordering rules the same effect could be achieved by determining the correct order of weave for the various aspect categories. Effectively an ordered weave enables implementation of the matrix shown in FIG. 9.

This weave can be achieved with the following algorithm:
Using service-type-aspects introduce process steps for estimatingReplaceCost for the niche-dispose type, estimateOpenTestingCost for the nicheValue service type, estimateReplaceCost for the mass-dispose service type and estimateServicingCost for the mass-value type.
Use advise weaves to place calls to these process steps into the generic process pattern step Introduce a process step for estimateServicingCost for the corporate customer type.
Use an advise weave to the estimateReplaceCost process step (introduced by the previous weave) to add the estimateServicingCost step to the process[1].

[1] It should be noted that using the Aspect-J weaver it is necessary to also add a return( ) statement to force the process step to finish execution at this point.

Introduce a process step for estimateCustomerEnabledCost in the corporate customer type.
Use an advise weave to the estimateOpenTesting step introduced for the nicheValue service type to force this step into the specialised process.
Introduce a process step for estimateCustomerEnabledCost in the individual customer type.
Use an advise weave to the estimateReplaceCost to force this step into the process.

This algorithm is sufficient to generate the matrix of problem management strategies appropriate for the particular customer using the particular service as shown in FIG. 5 except that the corporate-mass-dispose co-ordinate of the matrix is wrongly populated with a servicing policy. This is because there is a conflict between the exceptional case of replacing an estimateReplaceCost step for a corporate with a estimateServicingCost and the exceptional case of replacing an estimateReplaceCost step for a corporate with a estimate3rdPartyCost. The price of using this method is the incorrect entry in the matrix, but the benefit is that it has been possible to generate the twelve elements of the matrix from seven process aspects.

In the following section, the architecture of a process knowledge management system that would utilise ASOPE as its central component is described. The architecture is examined from two perspectives. The perspective of the organisational hierarchy of the system shows the logical structure of a Process Aspect repository. The business role perspective shows the way in which the system would interact with the participants in the business process in order to be of use.

Organisational Hierarchy Perspective

Figure 10:
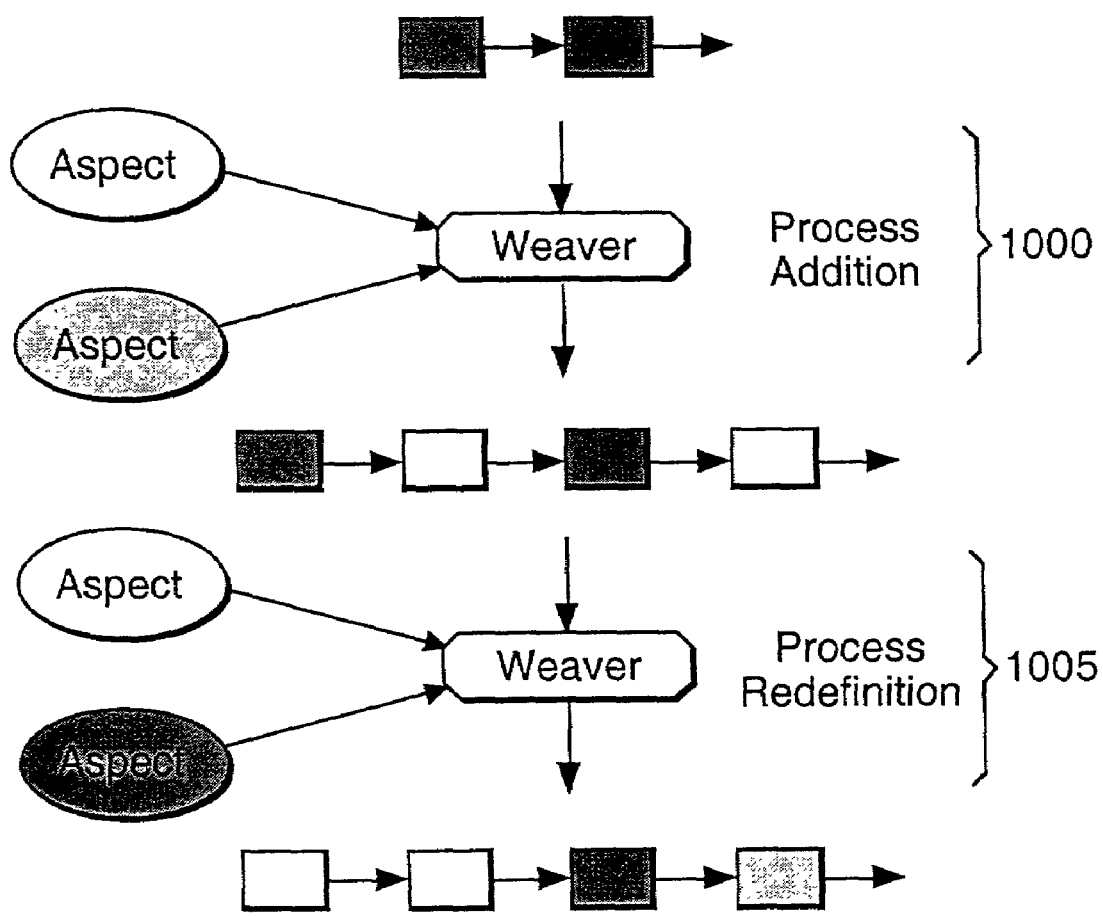
FIG. 10 shows iterative specialisation of a process as it passes through management domains.

The assumption underlying this perspective on the architecture is that the participants in the meta process of constructing and managing the enactment of the business process belong to particular management domains which are controlled by managers with limited, but real and valuable, autonomy. This enables the participants to determine which resources will be utilised to achieve a goal on the basis of the impact that their use will have on the characteristics of the process. FIG. 10 shows the process elements specialised by an ordinate layer 1000 being passed to a sub-ordinate layer 1005 to incorporate its process knowledge.

During each weave a process aspect can customise the process in two ways:

Process addition: A process step is added either before or after a previously defined step.

Process redefinition: A process step is redefined to make it relevant to the business process context.

User Role Perspective

Figure 11:
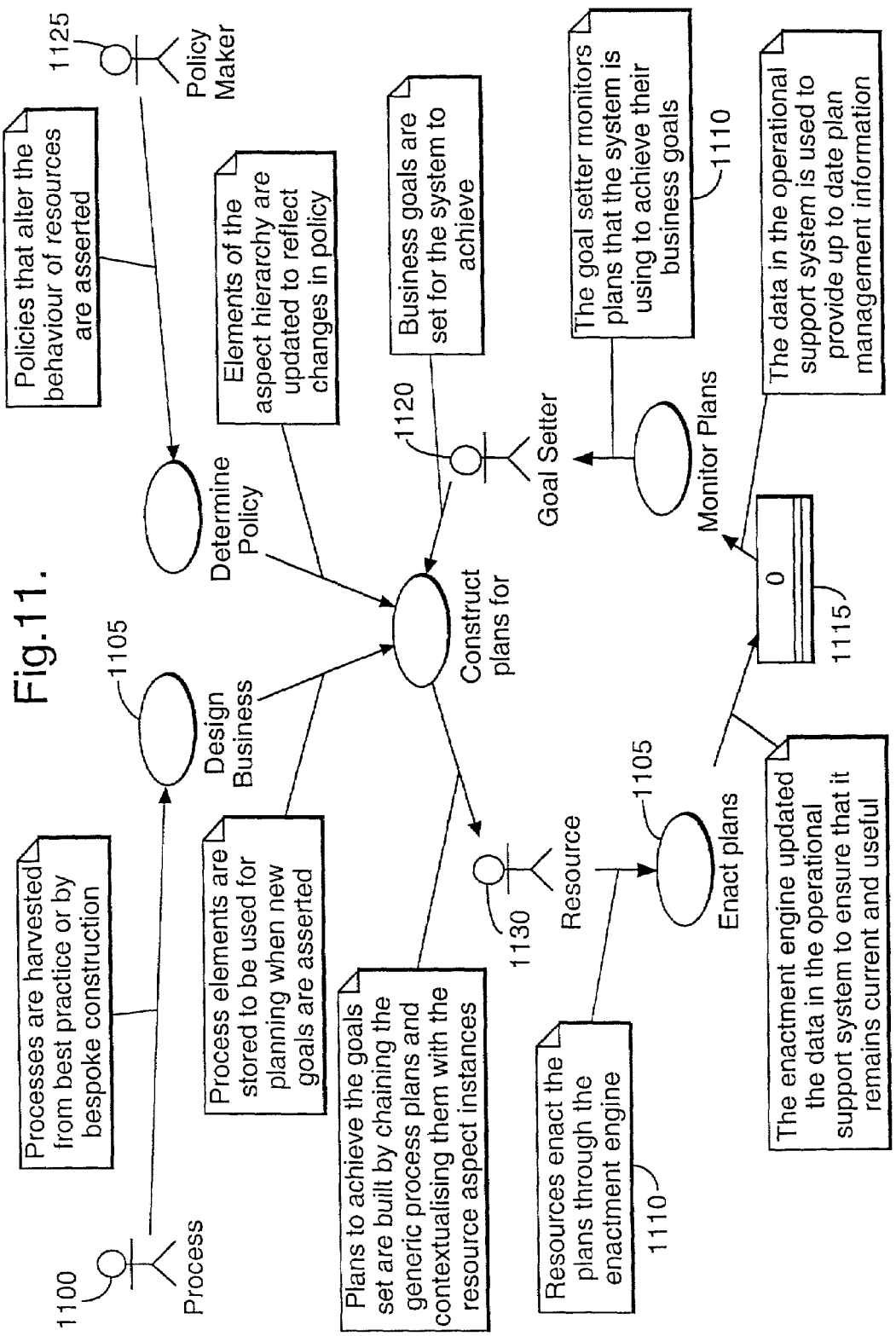
FIG. 11 shows a use case diagram of the system demonstrating interaction with users.

FIG. 11 shows a model of how an ASOPE system would be used within a commercial organisation. The model is shown as a UML use case diagram in which users of the process are shown as stick figures 1100 and use-cases (in this case activities in the process construction meta-process) are shown as ovals 1105. Notes 1110 are given on the interaction connections between the use cases 1105 and the users 1100. An operational support system 1115 is shown as a "class".

Figure 12:
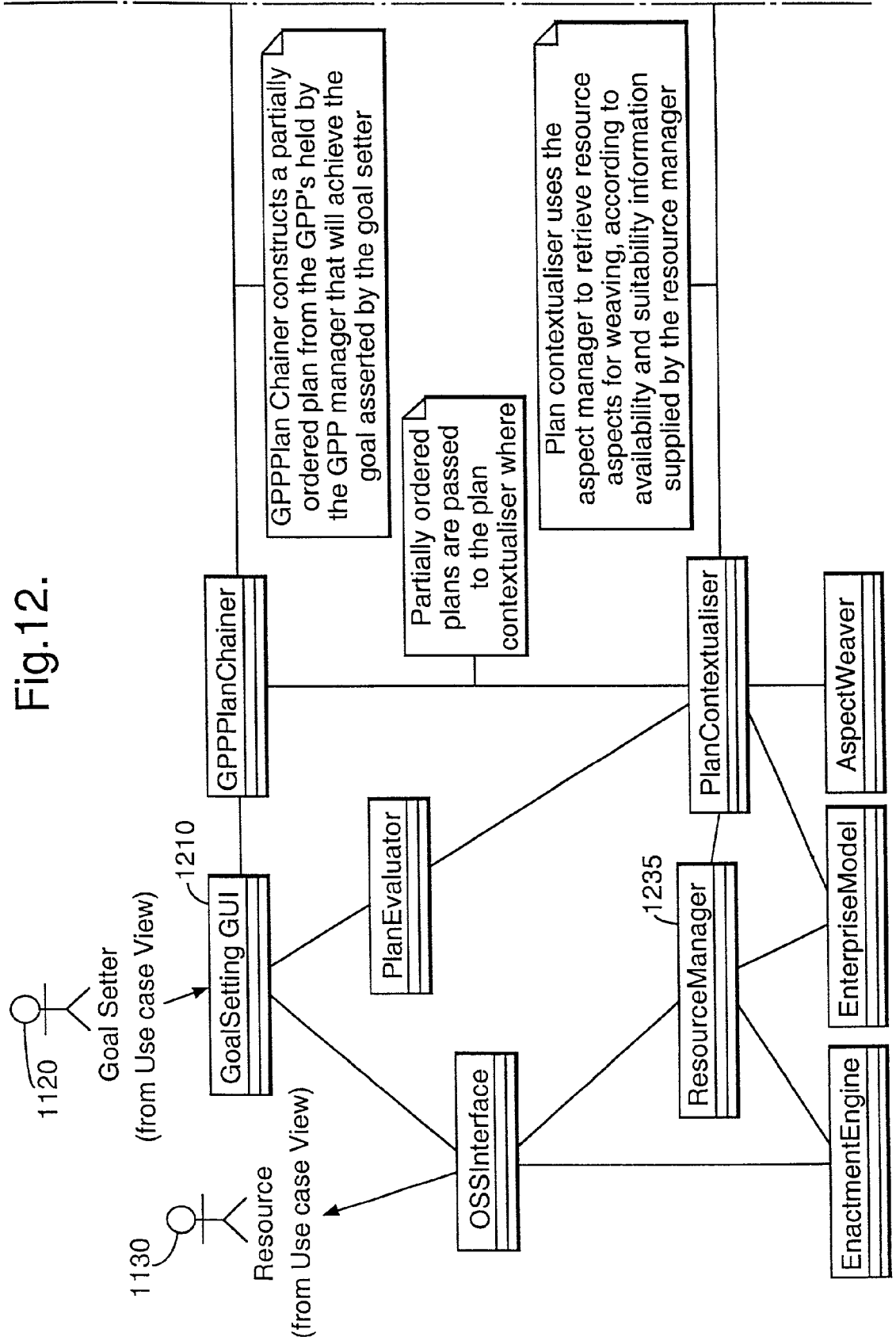
FIG. 12 is a class diagram of an embodiment of the process generation system.
Figure 12:
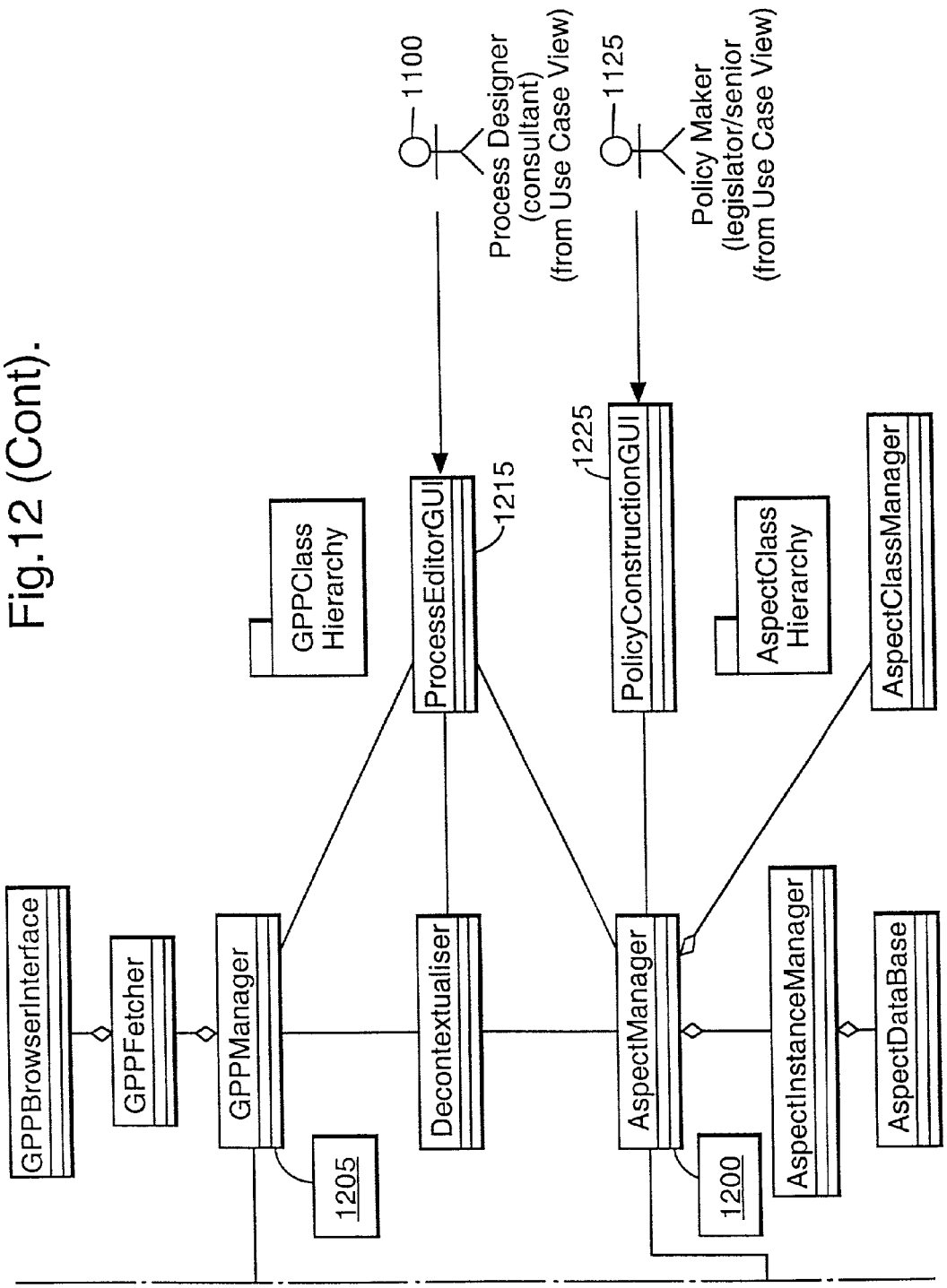

FIG. 12 shows a class diagram of components for building an embodiment of the present invention.

Referring to both FIGS. 11 and 12, the user interacts with the system, particularly to enter information, in three ways:

1) As a Goal Setter 1120 by setting a goal on the system which results in the automatic selection of a GPP to achieve the goal and the selection of resources to provision the GPP.
2) As a Process Writer 1100 by describing processes to the system in terms of GPPs and Aspects, via the Process Editing GUI 1215
3) As a policy maker 1125 describing policies that are integrated with the aspects via the policy editing GUI 1225.

The data stores (not shown) for holding entered information are the GPP library and an aspect library. The GPP library contains a set of descriptions of how a business goal can be achieved in terms of the sequence of activities that must be undertaken regardless of the context of the goal or the resources uses to achieve it. The "index" for GPPs would be the goals that they achieve. The Aspect Library is where process aspects will be stored. These aspects are the context and resource specific activities and are indexed on the resource or context that utilizes them.

FIG. 12 shows a class diagram of the components that might be deployed in implementing an embodiment of the present invention. An important point is that processes for construction are stored in two orthogonal hierarchical repositories, the aspect manager 1200 and the GPP manager 1205. Information is drawn from these and recombined to create processes that achieve goals specified via a goal setting interface 1210, tailored according to actual resource limitations monitored by a resource manager 1235.

The important point about FIG. 12 is that the processes are stored in two orthogonal hierarchical repositories (the Aspect Manager 1200 and the GPP manager 1205) from which information is drawn and recombined to create processes to achieve the desired goals. The advantages of this are:

1) Abstraction and representation of the process as a GPP which can be used as a template in multiple contexts.
2) The weaving process can be used to tailor business processes to meet individual goals.
3) The process aspects can be used to implement process steps that meet process constraints that are separate from the business goal, and are the concern of the local management.

The ASOPE approach is dynamic and adaptive in that the cycle of the process knowledge through the system results in the iterative updating and maintenance of the knowledge base.

It should be noted that, in the above, an implementation trick is used (the insertion of a return( ) statement in the generated program specifying the process) to produce a substitution effect in the weaving. It is believed that a substitution, or filtering weave, is necessary in order for the Aspect Orientated abstraction to be really useful both for process representation and software development. Composition filters have been used to develop Aspect Orientated systems that directly implement deletion mechanisms which are not implemented in Aspect-J™ (see M. Aksit and B. Tekinerdogan, Solving the Modeling Problems of Object-Oriented Languages by Composing Multiple Aspects Using Composition Filters, AOP'98 workshop position paper, 1998) and there is no obstacle to the implementation of more weave instructions.

Another characteristic of systems such as that described is the conceptual difficulty involved in the design of the weave orderings, and the correct decomposition and encapsulation of the process elements into generic process patterns and process aspects. This applies to any object orientated or frame based representation, because the essential answer to the question of "why is that the correct object model" is simply "we don't know, but it is". There are no hard rules for the development of object models, simply best practices and rules of thumb which apply only to the particular circumstances of the program and programmer who are structuring a particular model. Aspect Orientation however offers another tool which can be used to simplify the organisation of knowledge.

Variations envisaged in embodiments of the present invention include the provision of graphical support and the development of tools to build, maintain and use process repositories.

In a significantly more flexible variation of embodiments of the present invention, the operation of the aspect weaver 320 can be significantly improved by using an open instruction/action set rather than one which is installed at compile time for the aspect weaver.

Referring to FIGS. 13 and 14, this shows an iterative process for composing processes using aspect weaving. A set of Aspects 305 is combined with some user defined structure 300. The Aspect 305 contains a tag 1300 which is the instruction to be used, such as "before" or "after", the subject 1305 of the tag, which is a reference to an element in the "general structure to be specialised", and some data 1310 which will be interpreted by the composition algorithm 1400 of the weaver 320.

The composition algorithm 1400 of the weaver 320 takes the information that is parsed and processed by the weaver from the aspects 305 and structures 300 to be specialised by it, identifies action steps 1310 which aspects 305 determine will be woven into a structure 300 and matches these to actions in its fixed instruction/action set 1405. It then applies the actions from the fixed instruction/action set 1405 that are matched by the appropriate instruction from the aspect 305. In this way the structure 300 that is being processed becomes specialised as shown in FIG. 13. This method has the advantage of being simple to use, however, it is also limited to the semantics of the instruction/action set 1405 that is included in the aspect weaver 320. In some implementations the instruction/action set 1405 may not be separated from the composition algorithm 1400, however, in logical terms this makes no difference to the algorithm.

FIG. 15 shows an aspect weaver 320 which uses an open instruction/action set 1505, ie not written into the aspect weaver 320. This has two advantages. Firstly the behaviour of the weaver 320 can be specialised to be dependent on the domain. For example, the meaning of the tag "before" 1300 may be different in a real time domain and a data-processing domain. In the real time domain, it is essential that the elements in the aspect 305 that is composed are executed before the start time for the elements being specialised. This is a tight constraint. In the data processing domain the start time for the execution may be irrelevant, and all that is important is the ordering of execution.

A second advantage is that instructions that have no meaning for some domains may be introduced into the weaver 320. For example, in a computer system that has no multi-threading a weave instruction 1310 "in-parallel" is nonsensical. However in a multi-threading computer system it has a clear meaning (that a thread should be started to execute the elements in the aspect, and that the current thread should be suspended until that thread can be started). In a process weaving system it has another clear meaning that the start conditions for two parallel processes should be made true.

The rules in the instruction/action set take the form of [t,sub'=f(m,sub)] where t is the tag 1300, and sub'=f(m,sub) is the function to apply to the subject data in this case. The weaver can then apply the instruction/action set as in FIG. 13. At each step the subject sub is transformed into sub', and sub' is substituted for sub to specialise the structure. This is repeated until there are no matching conditions 1305 from the aspects 305 which can be applied to any part of the structure 300 being specialised.

The function sub'=f(m,sub) from the open instruction/action set therefore determines the meaning 1310 of the tag t at weave time. It is executed using standard reflection procedures (for example the mechanisms in java.lang.reflect.Method, java.lang.Class & java.lang.Object[2]) by the composition weaver. This contrasts to the scheme in FIG. 14 in which the meaning of t is determined at the compile time of the weaver itself.

[2] See Flanagan, D, 1999, "Java in a Nutshell", O'Reilly & Associates, Inc. ISBN: 1-56592-487-8

Identification of the domain, and therefore the correct sub', could be done in one or two ways, for instance by a data input by a user at runtime or via the index used for a generic process plan in storage.

What is claimed is:

1. A method of generating a process plan comprising:
   i) storing at least one generic process pattern, wherein the at least one generic process pattern defines a core process that must be executed in order to achieve a type of goal, wherein the core process is a partially ordered process which includes process steps, which are obligatory to achieve the type of goal;
   ii) storing at least one process aspect containing a predetermined pattern, wherein the at least one process aspect defines at least one context dependent process step that is carried out in order to achieve a particular goal;
   iii) searching said at least one generic process pattern for the predetermined pattern contained by the at least one process aspect,
   iv) on detection of the predetermined pattern, inserting content from said at least one process aspect into the generic process pattern to generate a process plan, and
   v) outputting the generated process plan,
      wherein instructions for the insertion of said content in said step of inserting content are coded into said at least one process aspect and said content inserted from said at least one process aspect introduces a new process step into the generic process pattern.

2. A method according to claim 1 further comprising the steps of receiving for storage the at least one generic process pattern and receiving for storage the at least one process aspect.

3. A method according to claim 1 wherein each stored generic process pattern is indexed in accordance with a goal to be achieved by the plan and the method further comprises:
   vi) receiving a goal input, and
   vii) selecting a generic process pattern for searching, said selection being in accordance with the received goal input.

4. A method according to claim 1 wherein the at least one process aspect comprises resource information, identifying one or more resources to support a process step in a generated process plan.

5. A method according to claim 4 wherein each stored process aspect comprising resource information is indexed in accordance with one or more relevant resources.

6. A method according to claim 1 wherein content of at least one inserted process aspect comprises data.

7. A method according to claim 1 wherein the at least one process aspect comprises context specific method steps or data and is indexed for storage according to a relevant context.

8. A method according to claim 7 wherein the context for the at least one process aspect is service type.

9. A method according to claim 7 wherein the context for the at least one process aspect is customer type.

10. A method according to claim 1 which comprises selecting an item of content from two or more alternative items of content, said two or more alternative items of content being identified from said coded instructions provided by said at least one process aspect, and inserting the selected content into the generic process pattern in generating a process plan.

11. A method according to claim 10 wherein the selection is domain specific.

12. A method of generating a process plan comprising:
   i) storing at least one generic pattern, wherein the at least one generic process pattern defines a core process that must be executed in order to achieve a type of goal, wherein the core process is a partially ordered process which includes process steps, which are obligatory to achieve the type of goal;
   ii) storing at least one process aspect containing a predetermined pattern, wherein the at least one process aspect defines at least one context dependent process step that is carried out in order to achieve a particular goal;
   iii) searching said at least one generic process pattern for the predetermined pattern contained by the at least one process aspect,
   iv) on detection of the predetermined pattern, inserting content from said at least one process aspect into the generic process pattern to generate a process plan, and
   v) outputting the generated process plan,
      wherein instructions for the insertion of said content in said step of inserting content are coded into said at least one process aspect, and said content inserted from said at least one process aspect advises an existing step of the generic process pattern.

13. An apparatus for use in generating a process plan, the apparatus comprising:
   i) a generic process pattern storage device that stores at least one generic process pattern, wherein the at least one generic process pattern defines a core process that must be executed in order to achieve a type of goal wherein the core process is a partially ordered process which includes process steps, which are obligatory to achieve the type of goal,
   ii) a process aspect storage device that stores at least one process aspect containing a predetermined pattern, wherein the at least one process aspect defines at least one context dependent process step that is carried out in order to achieve a particular goal,
   iii) means for searching the at least one generic process pattern for the at least one predetermined pattern contained in the process aspect,
   iv) means for inserting content from said at least one process aspect into the at least one generic process pattern on detection of the predetermined pattern so as to generate a process plan, and
   v) an output for generated process plans,
      wherein instructions foil the insertion of said content are coded into said at least one process aspect and said content inserted from said at least one process aspect introduces a new process step into the generic process pattern.

14. An apparatus for use in generating a process plan, the apparatus comprising:

i) a generic process pattern storage devise that stores at least one generic process pattern, wherein the at least one generic process pattern defines a core process that must be executed in order to achieve a type of goal wherein the core process is a partially ordered process which includes process steps, which are obligatory to achieve the type of goal, ii) a process aspect storage device that stores at least one process aspect containing a predetermined pattern, wherein the at least one process aspect defines at least one context dependent process step that is carried out in order to achieve a particular goal, iii) means for searching the at least one generic process pattern for the at least one predetermined pattern contained in the process aspect, iv) means for inserting content from said at least one process aspect into the at least one generic process pattern on detection of the predetermined pattern so as to generate a process plan, and v) an output for generated process plans, wherein instructions for the insertion of said content are coded into said at least one process aspect and said content inserted from said at least one process aspect advises an existing step of the generic process pattern.

15. An apparatus for use in generating a process plan, the apparatus comprising:

i) a generic process pattern storage device that stores at least one generic process pattern, wherein the at least one generic process pattern defines a core process that must be executed in order to achieve a type of goal, wherein the core process is a partially ordered process which includes process steps, which ore obligatory to achieve the type of goal, ii) a process aspect storage device that stores at least one process aspect containing a predetermined pattern, wherein the at least one process aspect defines at least one context dependent process step that is carried out in order to achieve a particular goal, iii) search means for searching the at least one generic process pattern for the at least one predetermined pattern contained in the process aspect, iv) selection means for selecting at least one item of content from a set of two or more alternative items of content, v) insertion means for inserting the selected item(s) of content on detection of the at least one predetermined pattern so as to progress towards generating a process plan, and vi) an output for generated process plans, wherein instructions for the insertion of said content are coded into said at least one process aspect, and said instructions identify the set of two or more alternative items of content and said content inserted from said at least one process aspect introduces a new process step into the generic process pattern.

16. An apparatus according to claim 15 wherein said selection means is adapted to select the at least one item of content with respect to a domain of operation for a generated process pattern.

17. An apparatus for use in generating a process plan, the apparatus comprising:

i) a generic process pattern storage device that stores at least one generic process pattern, wherein the at least on generic process pattern defines a core process that must be executed in order to achieve a type of goal wherein the core process is a partially ordered process which includes process steps, which are obligatory to achieve the type of goal, ii) a process aspect storage device that stores at least one process aspect containing a predetermined pattern, wherein the at least one process aspect defines at least one context dependent process step that is carried out in order to achieve a particular goal, iii) search means for searching the at least one generic process pattern for the at least one predetermined pattern contained in the process aspect, iv) selection means for selecting at least one item of content from a set of two or more alternative items of content, v) insertion means for inserting the selected items(s) of content of detection of the at least one predetermined pattern so as to progress towards generating a process plan, and vi) an output for generated process plans, wherein instructions for the insertion of said content are coded into said at least one process aspect, and said instructions identify the set of two or more alterative items of content and said content inserted from said at least one process aspect advises as existing step of the generic process pattern.

* * * * *